UNITED STATES PATENT OFFICE.

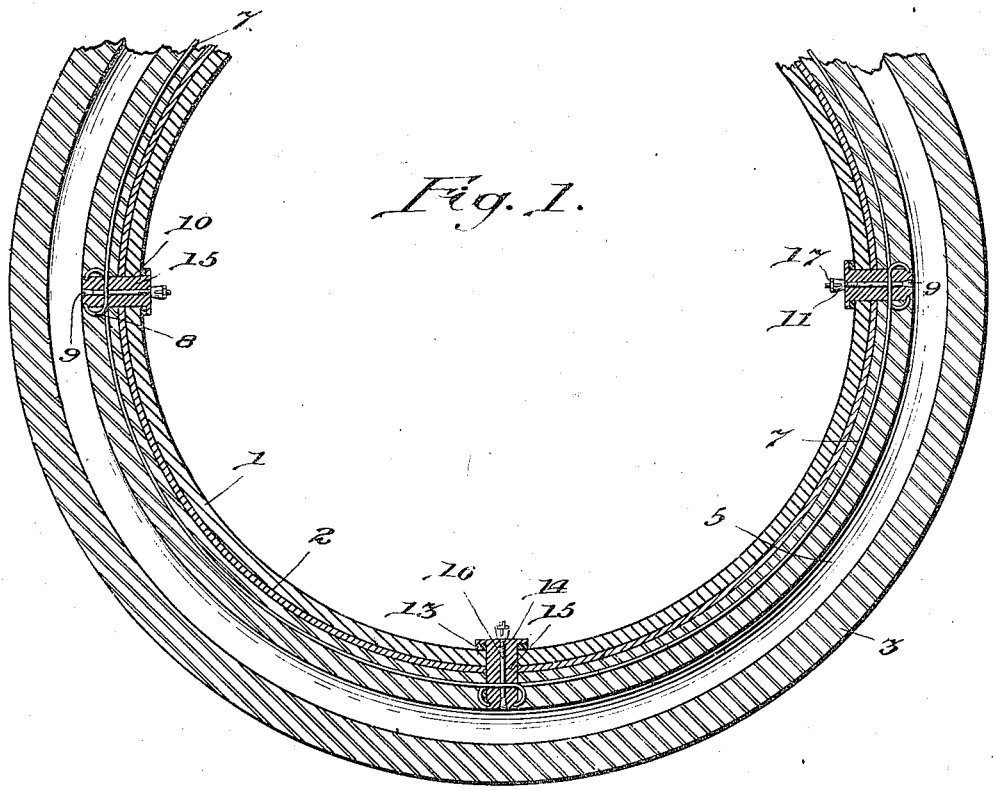
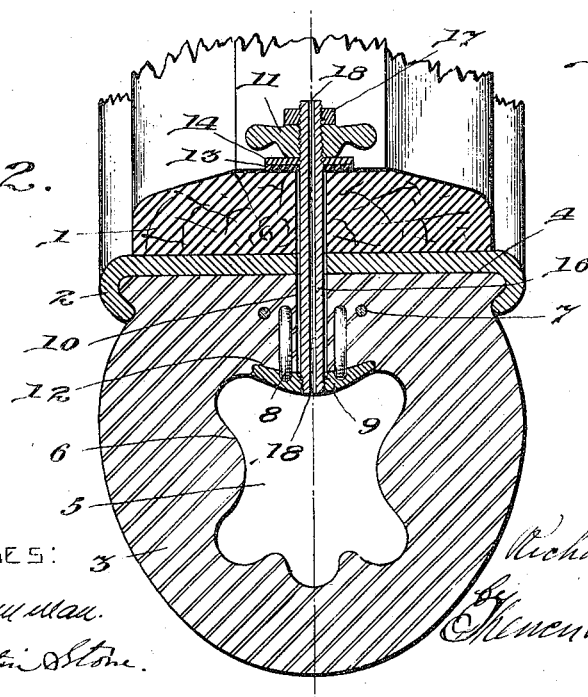
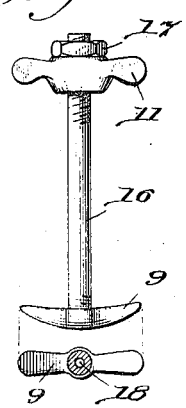

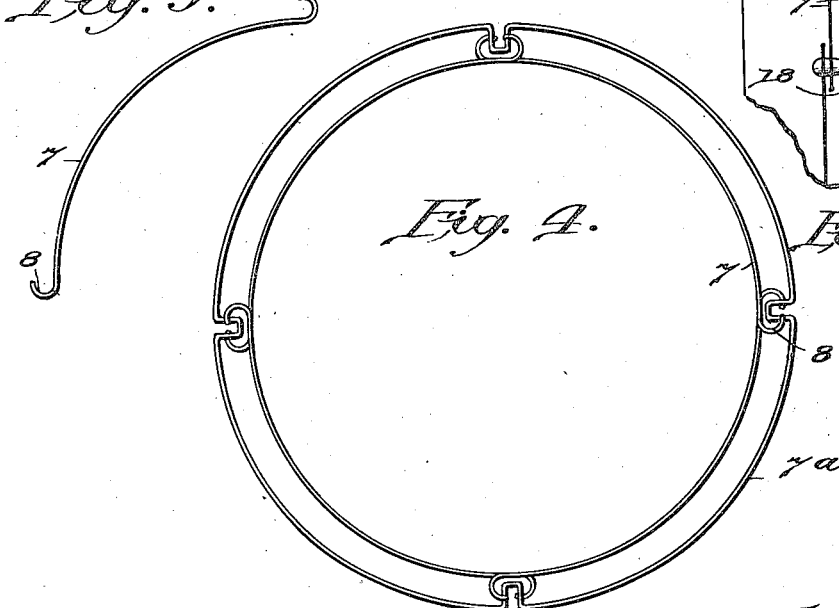
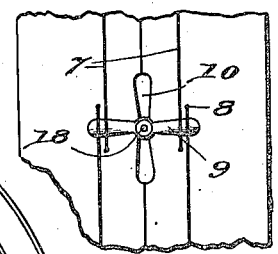
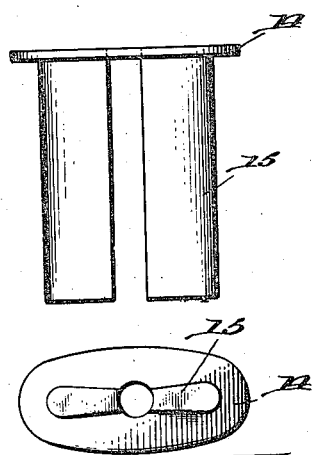
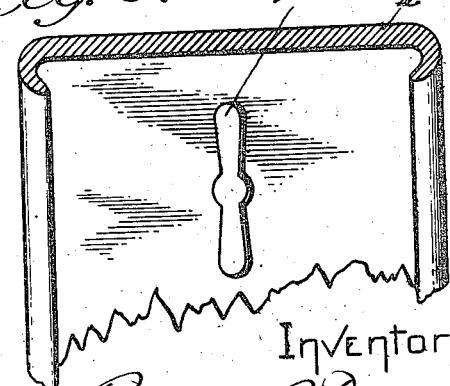

RICHARD C. DILLMORE, OF PHILADELPHIA, PENNSYLVANIA.

RESILIENT TIRE.

1,170,225. Specification of Letters Patent. Patented Feb. 1, 1916.

Application filed December 2, 1913. Serial No. 804,237.

*To all whom it may concern:*

Be it known that I, RICHARD C. DILLMORE, a citizen of the United States, residing at Philadelphia, in the county of Philadelphia and State of Pennsylvania, have invented new and useful Improvements in Resilient Tires, of which the following is a specification.

This invention relates to an improvement in resilient tires and particularly to the construction thereof and arrangement for fastening the same to the rims of vehicle tires.

One object of my invention is to provide a novel cushion tire combining the strength and durability of solid rubber tires with the resiliency of the pneumatic tire.

Another object of my invention is to provide a cushion tire which may be used on any standard clencher rim now used for pneumatic tires, without the necessity of any elaborate alterations in the rim.

Another object of the invention is to provide a positive means for locking the tire to the rim and thus to prevent creeping.

Another object of the invention is to provide a cushion tire so constructed that there is no danger of bursting or breaking by centrifugal force or casting as result of fast driving around curves.

Another object of my invention is to provide an air cooled tire combining the desirable features of the pneumatic and cushion tires, but not subject to the danger of bursting resultant of overheating, a fault common to both the ordinary cushion as well as the pneumatic tire. It is well known that air bubbles are formed in nearly all rubber castings and that solid cushion tires have exploded because of high speed having heated the air in one of these bubbles.

A further object is to provide an air cooled cushion tire which may be quickly converted into a low pressure pneumatic tire.

The invention also relates to certain details of construction which will be hereinafter more specifically described and claimed in the accompanying specification and claims, and illustrated in the accompanying drawings, in which:

Figure 1 represents a side elevation of my improved tire mounted on a rim and felly with a vertical central longitudinal section through the tire, rim and felly to illustrate the interior construction. Fig. 2 is an enlarged transverse radial section taken through one of the locking keys or breather tubes. Fig. 3 is a detached view of one of the combined locking keys and breather tubes. Fig. 4 shows an optional arrangement of reinforcing wires for the same type of tire. Fig. 5 represents a section of a standard clencher rim illustrating the shape of the oblong holes through which the locking key is inserted into the tire. Fig. 6 is a view of one of the metal washers and its plugs which are inserted into the space back of the locking key and surrounding the breather tube. Fig. 7 is a bottom view of the washer and plug shown in Fig. 6. Fig. 8 is a top plan view of the rubber washer used in conjunction with the locking key and metal washer illustrated in Fig. 6. Fig. 9 represents one of the single reinforcing wires. Fig. 10 represents diagrammatically a section of the tire broken away to show the relative position of the reinforcing wires and the locking key seated in its final position.

In referring to the details of the drawings like numerals will be used to designate like parts.

1 represents the felly of any vehicle wheel, 2 the metallic body of any conventional clencher rim, and 3 the resilient tire to be carried thereon, constructed according to my invention. The tire may be of any shape as regards its cross section, but according to the illustrated form it is nearly circular and is provided with a flat beaded base 4 to fit within the clencher rim 2.

In the center of the tire is the single non-deflatable air chamber 5 running the length of the tire and having its wall formed into a number of convex surfaces 6. The beaded base 4 of the tire 3 may or may not be formed with a circumferential slit therein extending centrally to the air space 5. As shown in the accompanying drawings I have used in the air chamber walls five convex surfaces 6, one on the top, two on the bottom and one on each of the sides. This particular form while not essential to the invention nevertheless gives the maximum of strength and resiliency to the walls of the tire, the single convex surface on the side walls of the chamber 5 gives the tire great sustaining power. The two convex surfaces at the tread side of the chamber 5 prove more efficient than a single convex surface at this point since when the top and bottom of the chamber come in contact the two convex surfaces prove more resilient than a single surface. It will be noticed that by using the two surfaces on the tread side with the concavity between them at no time can one of the holes 18 in the locking key 9 be sealed by the tread side of the air chamber wall.

Within the base wall of the tire, running longitudinally and on each side of the center are securely molded a plurality of reinforcing wires 7 formed with knobbed or recurved ends 8 and so arranged that the said ends overlap sufficiently to allow the introduction of the locking key 9 as will be hereinafter pointed out.

The felly 1 and rim 2 should be provided with oblong slots 10 with their length parallel to the rim and felly (Figs. 1, 2 and 5), the number to correspond to the number of overlapping points of the wires. Four wires on one side of the center of the base running parallel to another four on the other side, or eight wires in all, make a sufficiently strong tire, but should it be advisable to increase or decrease this number the change can be made without departing from the scope of the invention. In the present description I use four overlapping points, or eight wires and have illustrated the felly 1 and rim 2 provided with a corresponding number of oblong slots 10. An equal number of slots, to correspond with those in the felly and rim, are made in the base of the tire between the parallel wires at the point of overlapping, and so located that when a tire is placed on the rim the several slots in the felly, rim and base of tire will be in alinement.

After having snapped the tire 3 on rim 2 the locking key 9 is then inserted in the oblong slot 10, turned around 90° with the thumb screw 11 and pulled into the cross indentation 12 in the base of the tire between the overlapping ends 8 of the wires 7. The thumb screw 11 is next removed and the rubber washer 13 and metal washer 14 with its attached plug 15 slipped over the breather tube or rod 16 and the plugs 15 inserted into the felly, rim and base of tire parallel with the tube 16 and into the space just back of the locking key 9. The thumb screw 11 is then again applied to the tube 16, the rubber and metal washers 13 and 14 securely fastened in place and the thumb screw 11 held in position by the lock nut 17.

Referring to the drawings again, in Fig. 1 is illustrated the overlapping ends 8 the wires 7, the locking key 9 drawn into its cross position and forming a smooth surface with the interior of the air chamber 5. The plugs 15 are shown in position on either side of the breather tube rods 16 and locking key 9 and between the two rows of wires 7, flush with the surface of the air chamber 5.

In Fig. 2 is shown an enlarged view of a section through the locking key 9 and breather tube 16, showing the air passage 18. It will be noticed that the recurved ends 8 of the wires 7 engage with a locking key 9 and that air connection 18 allows free passage of air from the space 5 through the base of tire, rim and felly. The cross indentation or seat 12 to accommodate the locking key should be made deep enough to allow the key to lie flush with the wall of the air chamber 5. In this figure the washer 14 is visible but its attached plugs 15, which should be of the same thickness as the diameter of the breather tube 16, are not visible since they are adapted to fit into the space surrounding the tube in its entering position and can only be illustrated in a longitudinal section through the rim or tire. The locking key 9 and breather tube rod 16, of Fig. 3, may be made of one piece of metal, or in two parts which may be fastened together either by a threaded connection or some heat process.

In Fig. 4 I have illustrated an optional arrangement of the reinforcing wires in which additional strength may be obtained by the use of an extra wire, or wires 7ª bent to form a U-shape at the overlapping points of the wires 7, the depression being so made that the locking key 9 may be seated therein and adapted to hold the tire on the rim in the usual manner. The wires 7ª have been illustrated as forming one continuous piece but it may be made up of several sections without departing from the scope of my invention. In this arrangement as in the form illustrated in Figs. 1 and 2 the wires are molded and firmly embedded in the rubber base of the tire, and are completely protected thereby from contact with any foreign body either metal or wood.

When the oblong metal washers 14 are backed with soft oblong rubber washers 13 the tire can be locked so securely and made so nearly air-tight that it can easily be converted into a low pressure pneumatic tire without the use of an inner tube. Each locking key 9 when fastened in place engages the overlapping wires 7 and fits down snugly into a cross indentation 12 in the rubber wall 4 of the air chamber 5 in the base side of the tire next to the clencher rim. The locking key 9 and the metal plugs 15 of the oblong metal washer 14 when fitted into their proper places will lie flush with the convex surface of the air chamber and will have the form of a metal Maltese cross firmly embedded in the rubber, (Fig. 10).

The tire when securely locked on the clencher rim 2 as hereinbefore described can be easily changed to a low pressure pneumatic tire by using three cap nuts fitted with small rubber cushions in the top of each cap nut and then locking them securely on the protruding ends of all but one of the breather tubes 16, and then attaching a pneumatic tire valve to the end of the other tube. The tire can then be pumped up to a few pounds pressure and will be in condition to stand more hard use than ordinary pneumatic tires owing to the fact that my tire has thick resilient sustaining walls with the powerful convex surfaces 6 forming an air chamber.

It will thus be seen that I have invented an air cooled cushion tire which may be transformed readily into a low pressure pneumatic tire, and that the plurality of wires together with their peculiar shape and the co-acting locking key hold the tire firmly to the rim, preventing casting of the tire by side rolling or other similar accidents due to overheating. The tire is adapted for use on the same rim now used for pneumatic tires, after a few small holes have been made in the rim. This in itself is a great benefit because heretofore if cushioned tires were to be fitted to a machine or vehicle of any sort a different set of rims had to be used. Spinning of the tire and the subsequent cuts in the composition thereof due to fast driving on rough roads, a fault common to all pneumatic tires is avoided in my invention. The heavy convex walls of the tire, and the air cooled cushion chamber result in the tires "hugging" the ground. This means more mileage per gallon of fuel as well as better control of the vehicle and freedom of tire trouble of all kinds.

Changes in the proportions shown in the drawings may be made without departing from the scope of the invention.

What I claim and desire to secure by Letters Patent is:

1. A vehicle tire of resilient material provided with a plurality of longitudinal reinforcing wires embedded in the tire, having their ends overlapping from opposite directions, and fastening means coöperating with the ends of said wires to lock the tire on a rim, said wires forming substantially a single circle consisting of a plurality of wire arcs, the ends of adjacent arcs overlapping each other.

2. A vehicle tire of resilient material provided with a plurality of sets of longitudinal reinforcing wires embedded in the tire, and fastening means coöperating with said wires to lock the tire on a rim, each of said sets consisting of a plurality of longitudinal wires having their ends overlapping from opposite directions, forming substantially a single circle having a plurality of wire arcs, the ends of adjacent arcs overlapping each other.

3. A vehicle tire of resilient material having an open side, a plurality of longitudinal reinforcing wires embedded in the tire on either side of the opening and having the ends of the wires on either side overlap from opposite directions, and fastening means coöperating with the ends of said wires to lock the tire on a rim, said wires forming substantially a single circle on each side of said opening consisting of a plurality of wire arcs, the ends of adjacent arcs overlapping each other.

4. A vehicle tire of resilient material provided with a plurality of sets of reinforcing wires embedded in the tire, and fastening means coöperating with the ends of said wires to lock the tire on a rim, each of said sets consisting of a plurality of longitudinal wires formed with recurved ends and having their ends overlapping from opposite directions.

5. A vehicle tire of resilient material provided with a plurality of longitudinal reinforcing wires embedded in the tire, and fastening means coöperating with the ends of said wires to lock the tire on a rim, said ends of the wires being recurved and overlapping each other from opposite directions.

6. A vehicle tire of resilient material having an open side, a plurality of longitudinal reinforcing wires embedded in the tire on either side of the opening, and fastening means coöperating with the ends of said wires to lock the tire on a rim, the ends of said wires being recurved and overlapping each other from opposite directions.

7. A resilient tire having longitudinal reinforcing wires embedded therein, the ends of said wires being recurved and overlapping each other from opposite directions, and a locking member extending through the base of the tire and seated therein between the recurved ends of said wires, said wires forming substantially a plurality of wire arcs overlapping each other.

8. A resilient tire having longitudinal reinforcing wires embedded therein, the ends of said wires being recurved and overlapping each other from opposite directions, and additional longitudinal reinforcing wires concentric with the first and with bends therein to conform with the overlapping recurved ends thereof, and fastening means coöperating with the ends of said wires to lock the tire on a rim.

9. In a vehicle wheel, a felly, rim and resilient tire having longitudinal reinforcing wires embedded therein, the ends of said wires being recurved and overlapping, and a locking member inserted through the felly, rim, and base of the tire and turned to seat between the recurved ends of the reinforcing wires.

10. In a vehicle wheel, a felly, rim and resilient tire having longitudinal reinforcing wires embedded therein, the ends of said wires being recurved and overlapping, a locking member inserted through the felly, rim and base of the tire and turned to seat between the recurved ends of the reinforcing wires, and a two-part plug fitted into the felly, rim and base of the tire on either side of the shank of the locking key, the plugs ending flush with the surface of the locking member within the tire and preventing the latter from turning, the base of the plug fitting over the shank of the locking member and held firmly to the felly by suitable locking means.

11. A resilient tire having longitudinal reinforcing means embedded therein including a wire having recurved ends, and locking members extending through the base of the tire and seated therein between the recurved ends.

In testimony whereof I have hereunto set my hand in presence of two subscribing witnesses.

RICHARD C. DILLMORE.

Witnesses:
GEORGE MARX,
JOHN B. COOKE.